United States Patent [19]
Nishimura et al.

[11] Patent Number: 5,121,193
[45] Date of Patent: Jun. 9, 1992

[54] COLOR SIGNAL PROCESSOR FOR A VIDEO CAMERA

[75] Inventors: Ryuji Nishimura, Yokohama; Masaru Noda, Ninomiya; Takuya Imaide, Yokohama, all of Japan

[73] Assignee: Hitachi, Ltd., Tokyo, Japan

[21] Appl. No.: 419,220

[22] Filed: Oct. 10, 1989

[30] Foreign Application Priority Data

Oct. 17, 1988 [JP] Japan .................. 63-259455

[51] Int. Cl.⁵ ............................................ H04N 9/07
[52] U.S. Cl. ............................................ 358/44
[58] Field of Search .............. 358/482, 483, 75, 80, 358/44, 41, 48, 43, 42, 213.11, 447, 448, 37

[56] References Cited

U.S. PATENT DOCUMENTS

| | | | |
|---|---|---|---|
| 4,638,352 | 1/1987 | Noda et al. | 358/44 |
| 4,714,955 | 12/1987 | Nishimura et al. | 358/48 |
| 4,768,084 | 8/1988 | Noda et al. | 358/44 |
| 4,794,448 | 12/1988 | Takizawa | 358/44 |
| 4,833,527 | 5/1989 | Kondo | 358/44 |
| 4,882,622 | 11/1989 | Uzuda et al. | 358/75 |
| 4,931,873 | 6/1990 | Nishiura | 358/213.11 |
| 4,992,860 | 2/1991 | Hamaguchi et al. | 358/75 |

OTHER PUBLICATIONS

Single-Chip Color Cameras with Reduced Aliasing; Imaide et al; Journal of Imaging Tech.; vol. 12, #5; Oct. 1986.

Primary Examiner—Edward L. Coles, Sr.
Assistant Examiner—Jerome Grant, II
Attorney, Agent, or Firm—Antonelli, Terry, Stout & Kraus

[57] ABSTRACT

A signal processor for a video camera, comprising a solid-state image sensor having a light sensitive part with a two-dimensional array of a plurality of pixels corresponding to first, second, third and fourth color signals, and outputting line sequential signals where first point sequential signals composed of the first and second color signals and second point sequential signals composed of the third and fourth color signals are alternately repeated during horizontal scan periods in a television system; means for individually separating the first, second, third and fourth signals included in the line sequential output signals of the solid-state image sensor, and then outputting the separated signals per horizontal scan period; and means for producing three primary color signals R, G, B by calculating the first, second, third and fourth color signals.

9 Claims, 9 Drawing Sheets (a) (b)

| Mg | G |
|----|---|
| Cy | Ye |
| Mg | G |
| Ye | Cy |

| Mg | G |
|----|---|
| Cy | Ye |
| G | Mg |
| Cy | Ye |

COLOR SIGNAL PROCESSOR FOR A VIDEO CAMERA

BACKGROUND OF THE INVENTION

1. Field of the Invention

The present invention relates to a signal processor for a video camera and, more particularly, to a color signal processor for a video camera using a CCD image sensor.

2. Description of the Prior Arts

In ordinary home video cameras, it is general to employ a CCD image sensor due to an advantage that a compact structure is achievable. An exemplary signal processor for such a video camera is disclosed in "A Single Chip CCD color Camera System Using Field Integration Mode", The Journal of the Institute of Television Engineers of Japan, Vol. 3 No. 10 (1983), pp. 855–862.

The above known technique is such that, for the purpose of equalizing luminance signals in individual fields and lines despite mixing of the signal charges of two vertically adjacent pixels, and also for obtaining at least two kinds of color signals in two horizontal lines, two-pixel mixed reading color filters including yellow (ye), cyan (Cy), magenta (Mg) and green (G) filters are used which are arrayed to form plural matrices of two columns and four rows. Accordingly, there is obtained in each horizontal line a luminance signal (2R+3G+2B) based on (Ye+Mg)+ (Cy+G) or (Ye+G)+(Cy+Mg). There are also obtained, in every other line sequentially, a near blue color difference signal 2R−G based on (Ye+Mg)− (Cy+G), and a near red color difference signal 2B−G based on (Cy+Mg)−(Ye+G). In such prior art, however, white balance adjustment is performed with respect to the color difference signals, so that the composition of the color difference signals is changed in conformity with the white balance adjustment. This consequently brings about deterioration of the color reproducibility.

Furthermore, since the color difference signals are line sequential, the vertical color resolution becomes low to eventually raise a problem that false color signals are prone to be formed.

SUMMARY OF THE INVENTION

It is therefore an object of the present invention to provide an improved signal processor for a video camera in an attempt to ensure a high image quality while realizing satisfactory color reproducibility and minimizing false color signals.

For the purpose of attaining the object mentioned, the present invention has improvements in a signal processor for a video camera using an image sensor which produces point sequential first and second color signals corresponding to an array of color filters and line sequential signals composed of point sequential third and fourth color signals repeated alternately. A feature of the present invention resides in the provision of means for separately outputting, in each horizontal line scan period, the first, second, third and fourth signals included in the output signals of the image sensor; and another means for, producing R (red), G (green) and B (blue) signals by processing such four kinds of signals.

According to the present invention where three primary color signals R, G, B can be obtained in each horizontal line scan period, it becomes possible to perform white balance adjustment for such color signals R, G, B. Consequently, satisfactory color reproducibility is realized since the composition of the color signals remains unchanged despite any change caused in the color temperature.

Although three primary color signals can be generated by using any three out of the first through fourth signals, the calculation is executed on the basis of all four signals, so that the degree of freedom in the calculation is higher, and generation of false color signals can be suppressed by utilizing such higher degree of freedom.

BRIEF DESCRIPTION OF THE DRAWINGS

FIGS. 11a and 11b shows an array of color filters;

DESCRIPTION OF THE PREFERRED EMBODIMENTS

Figure 1:
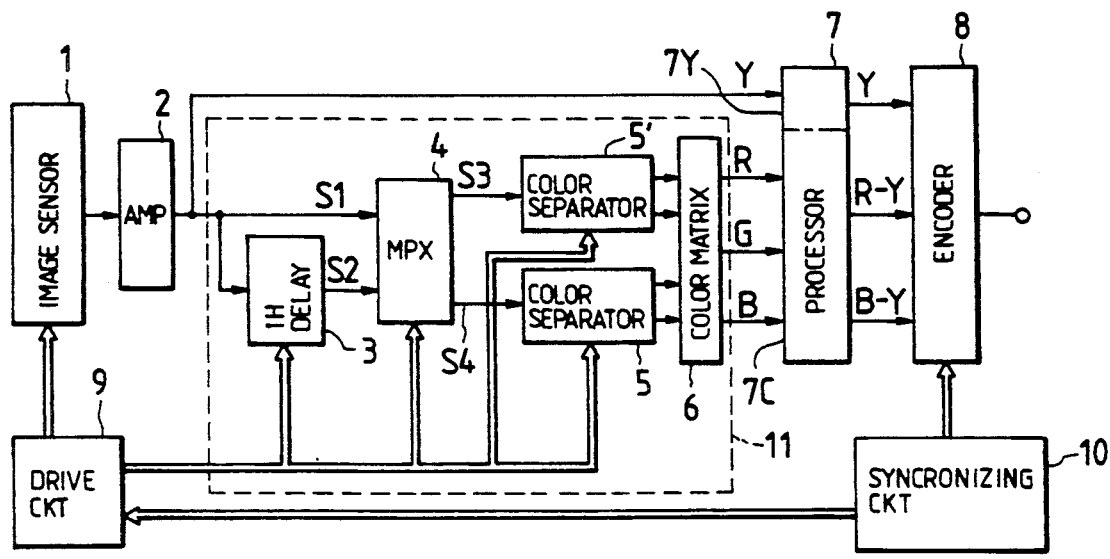
FIG. 1 is a block diagram of a signal processor embodying the present invention.

FIG. 1 is a block diagram showing the constitution of a signal processor of the present invention for a video camera. In this diagram, there are included an image sensor 1, an amplifier 2, a 1H delay circuit 3, a multiplexer 4, color separators 5, 5′, a color matrix circuit 6, a processor 7, an encoder 8, a drive circuit 9, and a synchronizing signal generator 10.

The operation of this embodiment will now be described below. The image sensor 1 is composed of a CCD type solid-state element. The image sensor 1 functions in response to a drive pulse generated from the drive circuit 9 and produces a video signal through photoelectric conversion and signal transfer. The amplifier 2 serves to amplify the video signal outputted from the image sensor 1. The amplifier 2 may be composed of a variable gain type which is adapted for raising its gain at the time of a low illuminance. In this stage, low-noise processing such as correlative double sampling may also be executed. The 1H delay circuit 3 delays the output signal of the amplifier 2 for a time corresponding to one horizontal line scan period. And in the multiplexer 4, the output signal of the amplifier 2 and the signal delayed therefrom for one horizontal line scan period are alternately switched (i.e. multiplexed) per horizontal line scan period. The color separators 5, 5′ respectively separate the colors of the two signals outputted from the multiplexer 4. The output of the image sensor is composed of point sequential color signals corresponding to the color filters arrayed in a light receiving part of the image sensor, and such point sequential signals are color-separated in the color separators 5, 5'. And the color matrix circuit 6 produces three primary color signals R (red), G (green) and B (blue) by calculating the four color-separated signals (Mg, Cy, G, Ye).

The processor 7 comprises a luminance processing part 7Y to process a luminance signal Y obtained from the amplifier 2 and a color processing part 7C which generates a color-difference forming luminance signal Y from the output signal of the color matrix circuit 6 and further generates a color difference signal by the use of such luminance signal Y. The processor 7 performs the known signal processing operations such as white balance, gamma correction and so forth. Then the encoder 8 produces a television signal of NTSC format or the like out of the luminance signal Y and the color difference signals $R-Y$ and $B-Y$ obtained from the processor 7.

Figure 2:
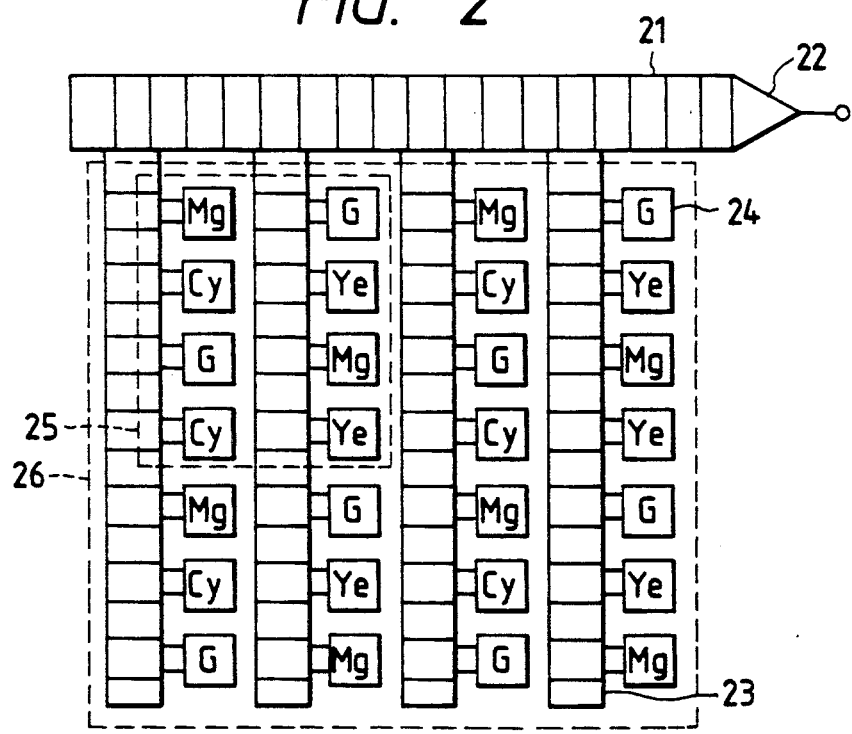
FIG. 2 illustrates the structure of an image sensor.

Now a detailed description will be given with regard to the operation in each block of the embodiment shown in FIG. 1. FIG. 2 illustrates an exemplary structure of the image sensor 1 employed in FIG. 1, wherein there are included a horizontal transfer part 21, an output part 22, and a vertical transfer part 23. To the vertical transfer part 23 are connected a multiplicity of pixels with color filters. Denoted by 24 is one of such pixels. The color filters are assorted in four kinds of Mg (magenta), G (green), Cy (cyan) and Ye (yellow), and are arrayed periodically with repetition of a basic unit (indicated by a broken line 25 in FIG. 2) consisting of a total of 8 pixels (two horizontal pixels and four vertical pixels).

The image sensor performs its operation in the following manner. Each pixel receives the color light conforming with the corresponding color filter and executes photoelectric conversion of the light received. The signal obtained as a result of such photoelectric conversion is transferred from each pixel to the vertical transfer part 23 during the vertical retrace period of the television system. The vertical transfer part 23 is composed of four-phase CCDs. Since pixels of 2 rows are disposed per vertical stage of CCDs, it is impossible to simultaneously transfer the signals of the entire pixels. Therefore, in odd fields, 1st and 2nd line signals, 3rd and 4th line signals, 5th and 6th line signals and so forth are mixed with each other respectively in the vertical transfer part. Subsequently the signals thus mixed are transferred upward stage-by-stage vertically per horizontal line retrace period. Meanwhile in even fields, 2nd and 3rd line signals, 4th and 5th line signals, 6th and 7th line signals of those read out from the pixels during the vertical line retrace period are mixed with each other respectively in the vertical transfer part. And thereafter such mixed signals are transferred upward stage-by-stage vertically per horizontal line retrace period similarly to the foregoing case of odd fields.

The signal transferred to the uppermost stage of the vertical transfer part is then transferred to the horizontal transfer part 21 during the horizontal line retrace period. In the horizontal transfer part 21, the signal is transferred during the scan period, and a video signal is produced from the output part 22. The video signal thus obtained is composed of point sequential signals corresponding to the color filter array where two horizontal pixels are synchronized, and also of line signals whose composition is changed per horizontal line scan period. For example, the video signal outputted during the first 1H period of an odd field is composed of point sequential signals Gr and Wb. In this case, Gr is a mixed signal G+Ye of pixels corresponding to the filters G and Ye; and Wb is a mixed signal Mg+Cy of pixels corresponding to the filters Mg and Cy. Similarly, during the next 1H period, there are outputted point sequential signals Wr and Gb, where Wr is a mixed signal Mg+Ye, and Gb is a mixed signal G+Cy. Thereafter the point sequential signals Gr and Wb and the point sequential signals Wr and Gb are outputted per 1H period to become line sequential signals. Also in every even field, similar line sequential signals are outputted.

Now a description will be given on the color signal processor which is a principal component of the present invention. Denoted by 11 in FIG. 1 is the color signal processor. The 1H delay circuit 3 exactly delays the point sequential signal, which is the output of the image sensor, for a time corresponding to one horizontal line scan period while maintaining the information of each pixel. For this purpose, the 1H delay circuit 3 is composed of CCD delay lines which are driven synchronously with the horizontal transfer part 21 (FIG. 2) of the image sensor 1. A clock signal for the 1H delay circuit 3 is denoted by $\phi 4$ in FIG. 5.

The transfer part 21 of the image sensor normally has a required number of stages corresponding to the scan period so as to operate merely during the scan period. However, since the 1H delay circuit 3 further operates in the retrace period as well, the CCD delay lines constituting the 1H delay circuit 3 are numerically greater than the stages of the horizontal transfer part 21 of the image sensor by a number equivalent to the retrace period. In case the stages are numerically insufficient, sample holding circuits and so forth may be additionally provided so that the delay time can be rendered exactly coincident with one horizontal line scan period.

When the 1H delay circuit is driven synchronously with the image sensor, the following merits are achievable.

Firstly, there occurs no turnup due to the sampling, hence eliminating the necessity of filters in the anterior and posterior stages. And secondly, the precision relative to the delay time is enhanced to be remarkably high since it is determined by the clock signal of the delay line.

Figure 3:
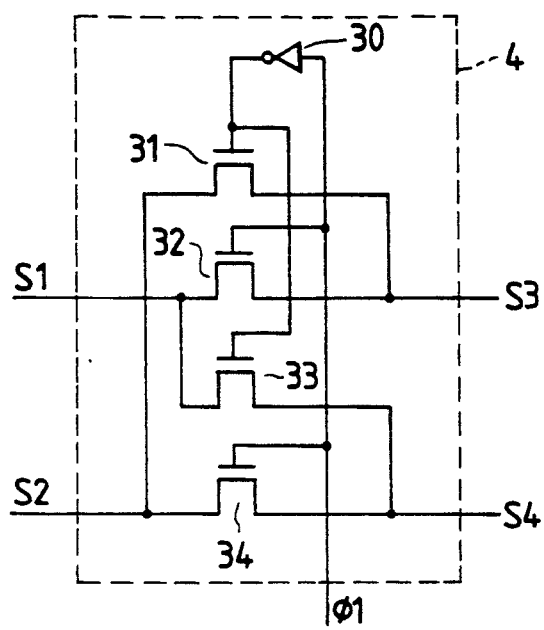
FIG. 3 shows the constitution of a multiplexer.
Figure 5:
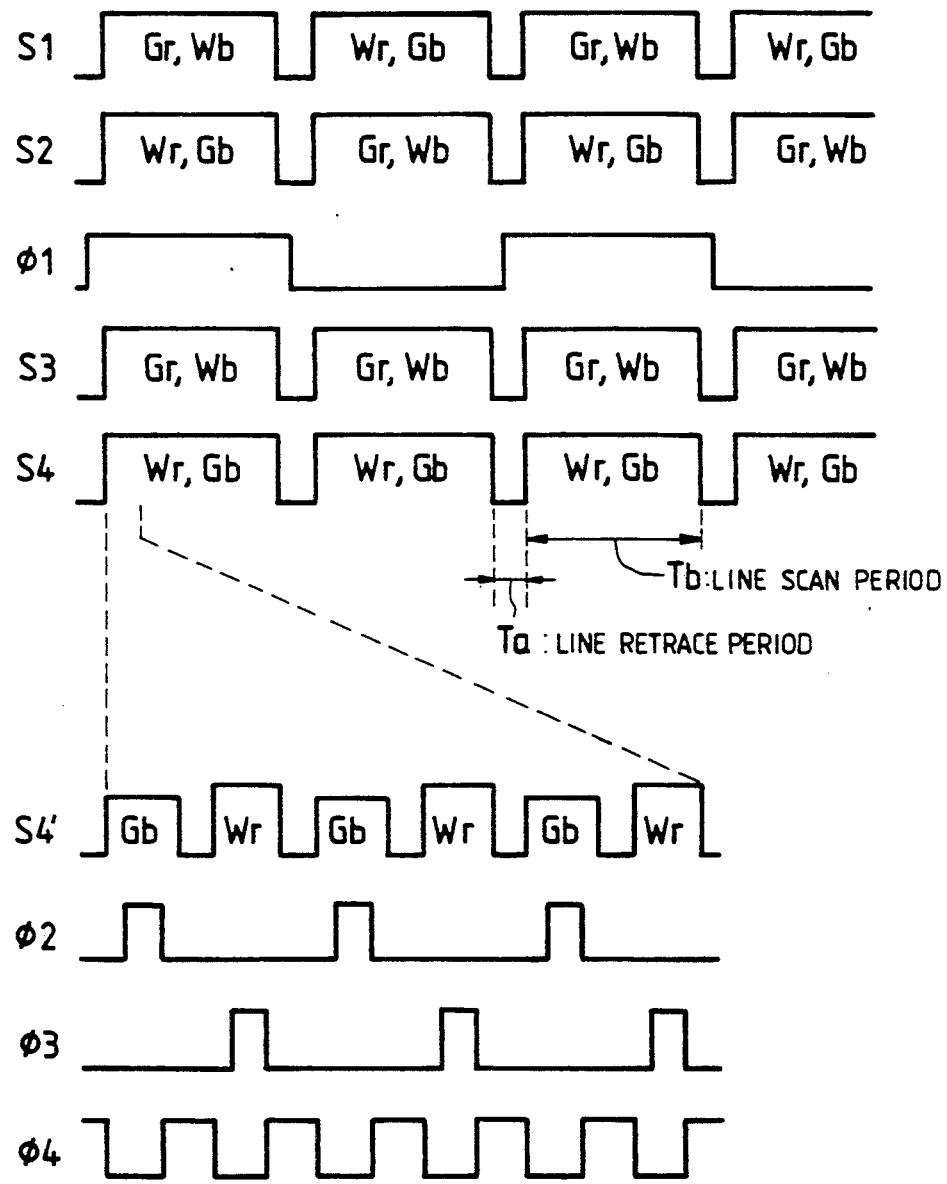
FIG. 5 is a waveform chart of signals.

FIG. 3 shows an exemplary constitution of the multiplexer 4 employed in FIG. 1, wherein there are included analog switches 31-34, and an inverter 30. FIG. 5 is a timing chart of input signals S1, S2; output signals S3, S4; and a pulse signal $\phi 1$. Regarding the input signal S1 in FIG. 5, the period denoted by Gr and Wb is a scan period during which the point sequential signals Gr and Wb are outputted; and the period denoted by Wr and Gb is a scan period during which the point sequential signals Wr and Gb are outputted. Represented by S2 is a signal obtained by delaying the signal S1 for a time of one horizontal line scan period. In the multiplexer shown in FIG. 3, the signals S1 and S2 are switched per horizontal line scan period to obtain point sequential signals of the same kind. For example, during the period where S1 is composed of point sequential signals Gr and Wb, the pulse $\phi 1$ rises to a high level so that analog switches 32 and 34 are turned on. And in the next horizontal line scan period where S1 is composed of point sequential signals Wr and Gb, the pulse $\phi 1$ falls to a low level while the output of the inverter 30 rises to a high level, so that analog switches 31 and 33 are turned on. As a result, S3 always becomes point sequential signals Gr and Qb, while S4 always becomes point sequential signals Wr and Gb.

Figure 4:
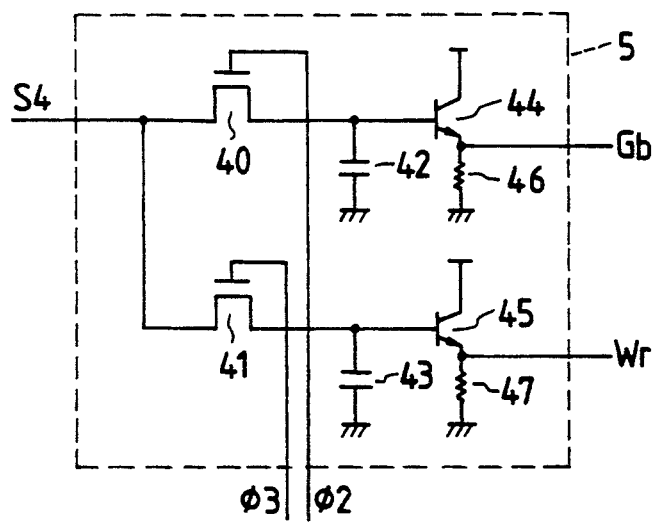
FIG. 4 shows the constitution of a color separator.

FIG. 4 shows an exemplary constitution of the color separator 5 in FIG. 1. An input signal S4 is composed of point sequential signals Wr and Gb. Its waveform during the line scan period is schematically illustrated as S4′ in FIG. 5. Two-phase pulses ∅2 and ∅3 turned to a high level during the output period of the signals Gb and Wr are applied to the gates of analog switches 40 and 41. An analog switch 40, a capacitor 42, a transistor 44 and a resistor 46 constitute a sample holding circuit; and an analog switch 41, a capacitor 43, a transistor 45 and a resistor 47 constitute another sample holding circuit, wherein an output signal Gb is obtained from the transistor 44 and an output signal Wr from the transistor 45.

The color separator 5′ in FIG. 1 is structurally similar to the aforementioned one shown in FIG. 4 and produces output signals Gr and Wb in response to the input S3 composed of point sequential signals Gr and Wb.

The color matrix circuit 6 shown in FIG. 1 generates three primary color signals R, G, B out of the four kinds of signals Gb, Wr, Gr, Wb outputted from the color separators 5 and 5′.

Calculations of the signals R, G, B are executed as follows. Representing the signals Gb, Wr, Gr, Wb by three primary color signal components r, g, b, the following are obtained on the basis of the relationship $Mg=r+b$, $G=g$, $Cy=g+b$, $Ye=g+r$.

$$Gb = Cy + G = 2g + b \quad (1)$$

$$Wr = Mg + Ye = b + g + 2r \quad (2)$$

$$Gr = Ye + G = 2g + r \quad (3)$$

$$Wb = Mg + Cy = 2b + g + r \quad (4)$$

Representing the signal components g, r, b by the signals Gb, Wr, Gr, Wb on the basis of Eqs. (1) through (4), the following are obtained:

$$\begin{aligned}
10 g &= \gamma(3Gr + Wr - 2Wb) + (1 - \gamma)\\
&\quad (3Gr + Wb - 2Wr)\\
&= 3\gamma Gb + 3(1 - \gamma)Gr - (3\gamma - 1)\\
&\quad Wb - (2 - 3\gamma)Wr
\end{aligned} \quad (5)$$

$$\begin{aligned}
10 r &= \alpha(3Wr - Wr - Gb) + (1 - \alpha)\\
&\quad (2Wb + 3Gr - 4Gb)\\
&= 3\alpha Wr + 3(1 - \alpha)Gr - (3\alpha - 2)\\
&\quad Wb - (4 - 3\alpha)Gb
\end{aligned} \quad (6)$$

$$\begin{aligned}
10 b &= \beta(3Wb + Wr - Gr) + (1 - \beta)\\
&\quad (2Wr + 3Gb - 4Gr)\\
&= 3\beta Wb + 3(1 - \beta)Gb - (3\beta - 2)\\
&\quad Wr - (4 - 3\beta)Gr
\end{aligned} \quad (7)$$

In Eqs. (5) through (7), $\alpha$, $\beta$, $\gamma$ are constants each having an adequate value greater than 0 and smaller than 1. By properly selecting the values of such constants $\alpha$, $\beta$, $\gamma$, generation of false color signals can be suppressed without causing harmful influence on the color reproducibility.

For example, substituting $Gb = +9$, $Gr = -9$, $Wr = +(r+b)$ and $Wb = =(r+b)$ in the right sides of Eqs. (5) through (7) and setting the value of each equation to 0, then there are obtained $\alpha \approx 0.9$, $\beta \approx 0.9$, and $\gamma = 0.5$.

Figure 6:
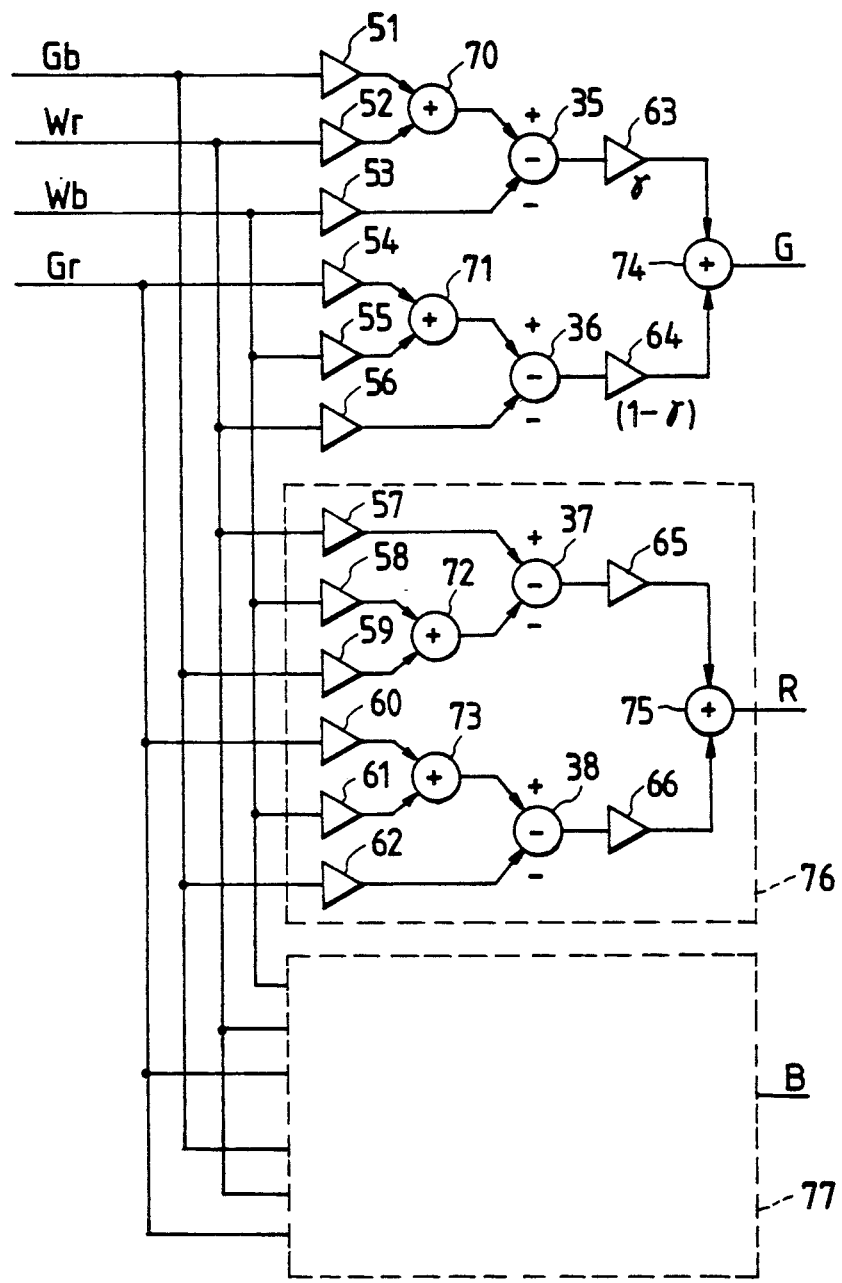
FIGS. 6 and 7 show the constitutions of color matrix circuits, respectively.

FIG. 6 shows a color matrix circuit for generating signals R, G, B by calculating Eqs. (5) through (7). This color matrix circuit is so formed as to correspond to the right side of the first line in each of Eqs. (5) through (7). Out of amplifiers 51-66, those denoted by 51 through 56 have amplification factors conforming with the coefficients of the signals Gb, Wr, Wb, Gr in Eq. (5). That is, the gains of the amplifiers 51-56 are selectively set to 3, 1, 2, 3, 1, 2 respectively.

Adders 70, 71 and subtracters 35, 36 execute addition and subtraction according to Eq. (5). Meanwhile the amplifiers 63, 64 execute amplification conforming with coefficients $\alpha$ and $\alpha - 1$, respectively. The individual signals thus amplified are added in the adder 74 to become a desired signal G.

With regard to the signal R also, similarly to the above, the amplifiers 57-62 execute amplification in conformity with the coefficients of Wr, Wb, Gb, Gr in the first line of Eq. (6), and then the adders 72, 73 and the subtracters 37, 38 execute addition and subtraction, respectively. Thereafter the amplifiers 65, 66 execute amplification conforming with the coefficients $\alpha$ and $\alpha - 1$ respectively, and the two signals thus amplified are added to each other by the adder 75 to become a desired signal R.

The B matrix circuit 77 has a constitution similar to that of the R matrix circuit 76 and produces a signal B by executing a calculation according to Eq. (7).

Figure 7:
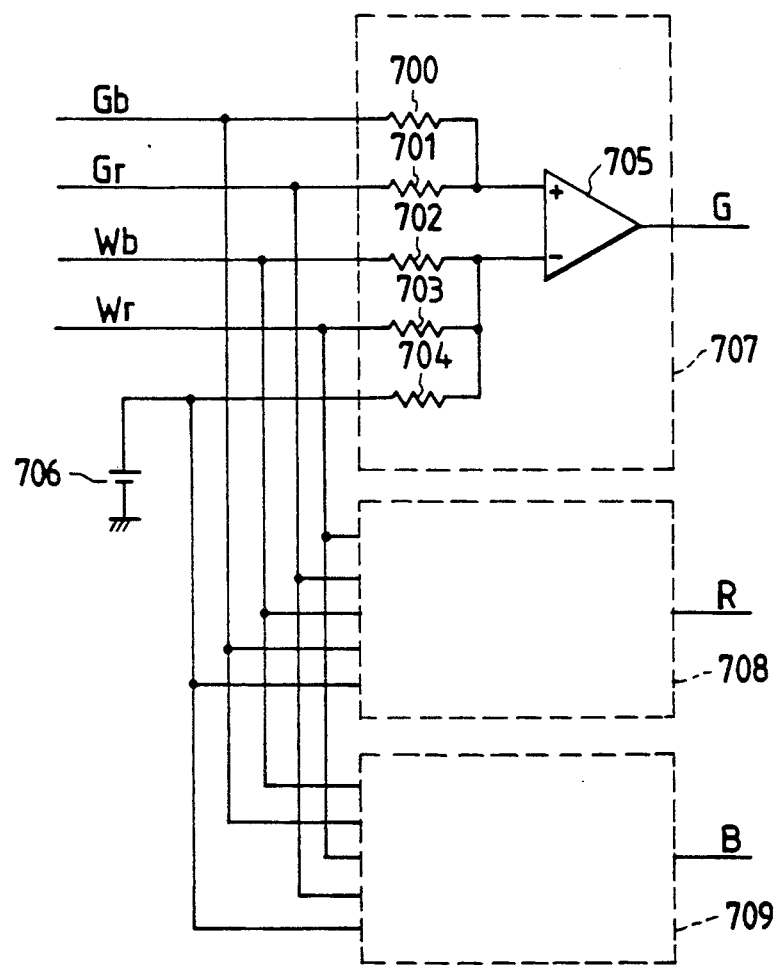

Another exemplary constitution of the color matrix circuit 6 is shown in FIG. 7. In this diagram are included resistors 700-704, a differential amplifier 705, a power supply 706, and a G matrix circuit 707. In this circuit, the resistances of the resistors 700-704 are selectively set to proper values to divide the input signal, whereby the individual coefficients of the signals Gb, Gr, Wb, Wr in Eq. (5) are set respectively.

The R matrix circuit 708 and the B matrix circuit 709 are structurally similar to the aforementioned G matrix circuit 707 and produce signals R and B according to Eqs. (6) and (7), respectively.

The color matrix circuits shown in FIGS. 6 and 7 are equivalent to Eqs. (5) through (7) and, in the case of FIG. 6, there exists the advantageous feature that facilitates adjustments of color reproducibility and false signal suppression. Meanwhile in the example of FIG. 7, the circuit configuration can be simplified.

As described hereinabove, in the signal processor of the present invention for a video camera, color signals are produced by using line sequential signals outputted from an image sensor and also two-line 1H delay signals thereof, so that the signals are utilized with high efficiency and a great signal-to-ratio is attainable. Furthermore, since the signals R, G, B are obtained by calculating the four kinds of two-line color-seprated signals, generation of false color signals can be minimized to consequently ensure a remarkably excellent picture quality with satisfactory color reproducibility.

Figure 8:
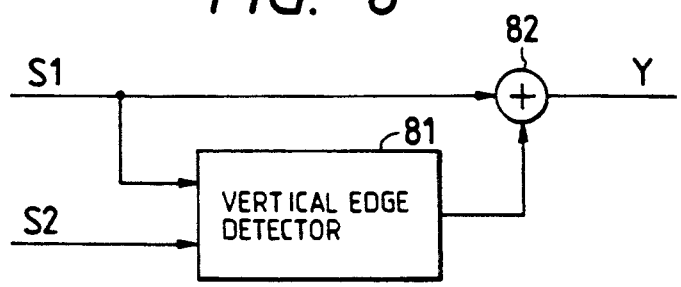
FIG. 8 is a block diagram of a vertical edge emphasizer.

Now another exemplary embodiment of the present invention will be described below. FIG. 8 is a block diagram showing the constitution of a vertical edge emphasizer, wherein a vertical edge is formed by a vertical edge detector 81 using the output signal S1 of the amplifier 2 in FIG. 1 and the 1H delay signal S2. An adder 82 serves to add the vertical edge to the original signal and thereby produces a luminance signal Y of a high vertical resolution. This edge emphasizer is employed in combination with the aforementioned embodiment of FIG. 1 so that a luminance signal with an emphasized vertical edge is inputted to the processor 7.

With regard to the technique of forming a vertical edge, there is disclosed an example in Japanese Patent Laid-open No. 52 (1977)-26116.

Generally, a 1H delay circuit is required for emphasizing the vertical edge. In this embodiment, however, the 1H delay circuit 3 shown in FIG. 1 can be utilized in common for such emphasis of the vertical edge, hence simplifying the circuit configuration.

In the edge emphasizer of FIG. 8, a luminance signal is obtained by adding the vertical edge signal to the original signal S1. However, the circuit configuration may be so modified as to obtain the luminance signal by adding the vertical edge signal to the signal S2 passed through the 1H delay circuit 3.

Figure 9:
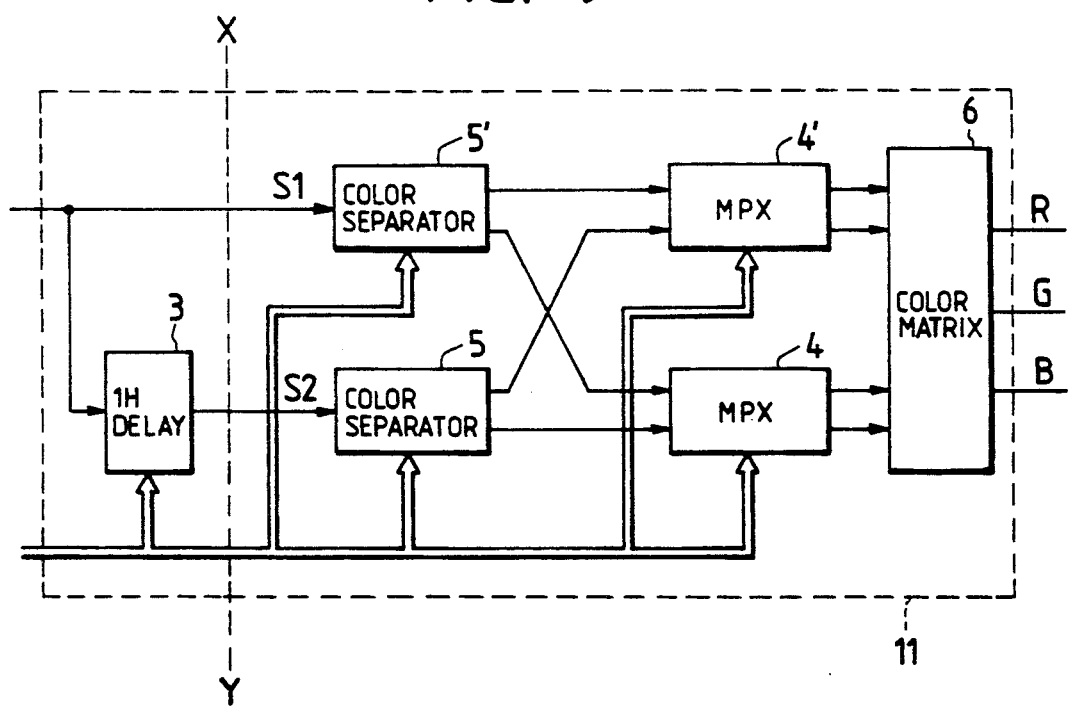
FIGS. 9 and 10 are block diagrams of color signal processors.

Describing a further embodiment of the present invention, FIG. 9 is a block diagram showing another exemplary constitution of the color signal processor 11 in FIG. 1. Differing from the aforementioned embodiment of FIG. 1 where the signals S1 and S2 are first multiplexed and then color-separated, the embodiment of FIG. 9 is so contrived that the order is reversed with respect to the operations of the multiplexer and the color separator. That is, color separation is first performed by the color separators 5, 5' and then the multiplexers 4, 4' function to multiplex the signals. In this embodiment, the signal processing operations are exactly equivalent to those in the foregoing embodiment of FIG. 1 with the exception that the operational order of color separation and multiplexing are so reversed as to perform color separation first. Since the multiplexed signal is color-separated in the foregoing embodiment of FIG. 1, the multiplexer 4 needs to have a great bandwidth. However, in this embodiment where color separation is performed first, the requirements for the circuits posterior to the color separation are satisfied if the color signal band-width can be ensured, whereby the degree of freedom is rendered higher in designing the circuit configuration.

Figures 10, 11:
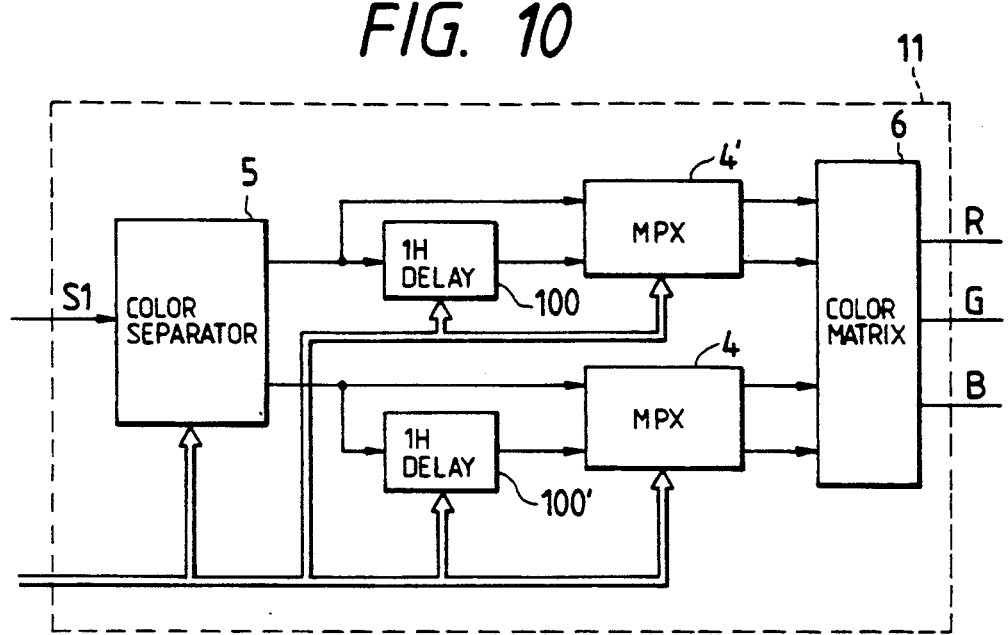

Describing a still further embodiment of the invention, FIG. 10 is a block diagram showing another exemplary constitution of the color signal processor 11 in FIG. 1. Although the color signal processing operation performed in this embodiment is equivalent to that in the foregoing example of FIG. 1, the difference resides in that color separation is performed before delaying the signal S1 for a time of one horizontal line scan period. In FIG. 10, point sequential signals are color-separated by a color separator 5, and then two signals thus separated are delayed in 1H delay circuits 100, 100' for a time of one horizontal line scan period. Thereafter the output signal of the color separator 5 and the output signals of the 1H delay circuits 100, 100' are multiplexed by means of multiplexers 4, 4' so that four kinds of signals Wb, Gr, Gb, Wr are obtained similarly to the aforementioned embodiment. A color matrix circuit 6 may be formed as shown in FIG. 6 or 7.

Although two 1H delay circuits 100 and 100' are required in this embodiment, the output signals of such circuits are those used for color signals. Therefore, narrow-band delay lines conforming with the color-signal frequency band may be employed as the 1H delay circuits 101 and 101'.

In execution of edge emphasis by using the color signal processor of this embodiment and the vertical edge emphasizer shown in FIG. 8, the output signals of the 1H delay circuits 101, 101' in FIG. 10 are added and inputted instead of the signal S2 shown in FIG. 8.

In the exemplary embodiment described above, an array of color filters other than those arranged for pixels of the image sensor 1 may also be used. FIG. 11(a) represents an example of such color filter array, and FIG. 11(b) represents a comparative example corresponding to the one denoted by reference numeral 25 in FIG. 2. In the color filter array (b), the horizontal positions of Mg and G are reversed in every other row where Mg and G are existent. Meanwhile in the filter array (a), the horizontal positions of Mg and G are fixed but the horizontal positions of Cy and Ye are reversed in every other row where Cy and Ye are existent.

In both filter arrays of FIGS. 11 (a) and (b), the result is the same with regard to that the point sequential signals Wb, Gr and Wr, Gb are outputted from the image sensor, and therefore the same signal processing circuit can be used. However, since the order of such point sequential signals become reverse, it follows that when the signal processor of FIG. 1 is used, the output signals Gb and Wr of the color separator 5 (FIG. 4) are replaced with each other. In the case of using the color filter array (a), as compared with another case of the color filter array (b), generation of a false signal in the luminance signal can be suppressed more, whereas color false signals are prone to increase upon occurrence of any variation in the color temperature. Therefore the constants [$\alpha, \beta, \gamma$ in Eqs. (5) through (7)] of the color matrix circuit 6 may be optimized in accordance with the color temperature variation.

Figure 12:
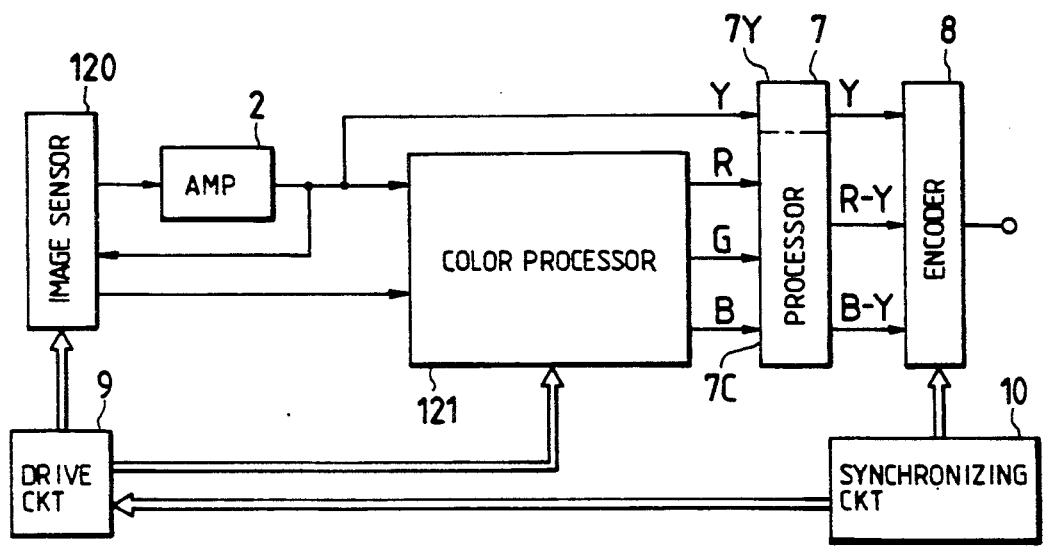
FIG. 12 is a block diagram of another embodiment of the present invention.

Hereinafter another embodiment of the present invention will be described with reference to FIG. 12 which is a block diagram of an exemplary video-camera signal processor according to the invention. Any components equal to those in the aforementioned embodiment of FIG. 1 are denoted by the same reference numerals, and a repeated explanation thereof is omitted. An image sensor 120 in this embodiment incorporates a 1H delay circuit therein. Denoted by 121 is a color signal processor which is the same in constitution as the color signal processor 11 of FIG. 9 excluding its 1H delay circuit, i.e. as the portion on the right side of the broken line X-Y. Similarly, the color signal processor 121 may have a constitution excluding the 1H delay circuit 3 from the aforementioned color signal processor 11 shown in FIG. 1.

Figure 13:
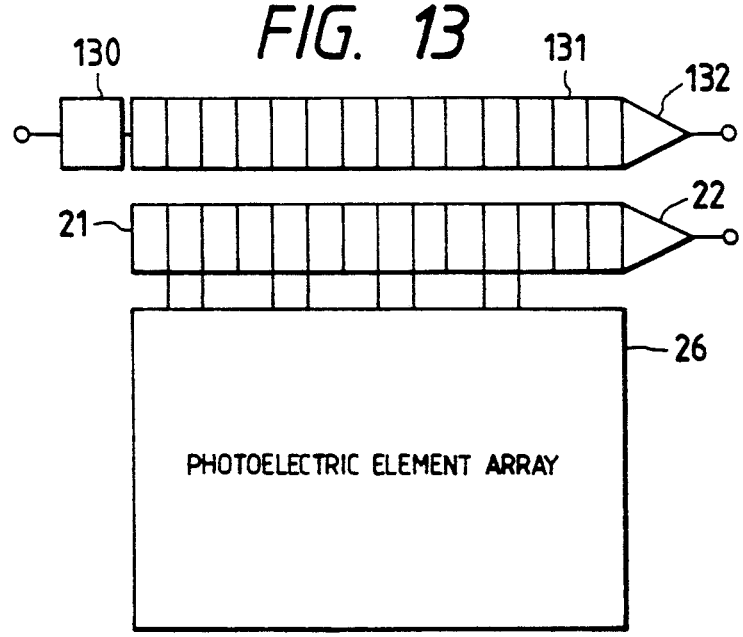
FIG. 13 illustrates the structure of an image sensor in FIG. 12.

Now a description will be given with regard to the structure of the image sensor 120 illustrated in FIG. 13, wherein a light receiving part 26 is structurally similar to the image sensor of FIG. 2. The image sensor 120 includes, in addition to the one shown in FIG. 2, a 1H delay circuit comprising an input part 130, a transfer part 131 and an output part 132. The transfer part 131 operates synchronously with the horizontal transfer part 21 in response to a drive pulse generated from a drive circuit 9. The signal produced from the output part 22 of the image sensor is amplified by the amplifier 2 and then is fed to the input part 130 of the image sensor 120. And after being delayed exactly for a time of one horizontal line scan period in the transfer part 131, the signal is forwarded from the output part 132.

Normally during the horizontal retrace period, the signal is transferred from the light receiving part 26 to the horizontal transfer part 21, so that the signal transfer operation to the transfer part 131 is interrupted. The number of stages of the transfer part 21 is properly set in such a manner that a 1H delay signal is outputted via the transfer part 131 during the next horizontal line scan period, and a 1H delay signal can be obtained exactly synchronously with the output signal of the image sensor forwarded via the horizontal transfer part 21.

In this embodiment, the circuit scale can be reduced since the 1H delay circuit is incorporated in the image sensor. And differing from this embodiment where the output signal of the image sensor is once amplified and then is fed in again from the input part 130, the circuit configuration may be such that the output part 22 and the input part 130 are connected directly to each other in the image sensor.

Figure 14:
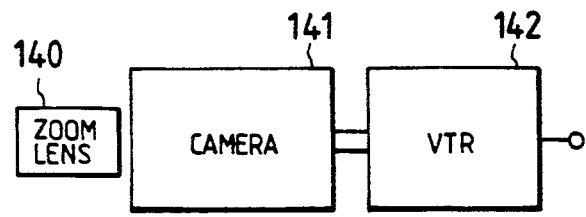
FIG. 14 shows the constitution of a video movie apparatus.

FIG. 14 is a block diagram showing the constitution of a video movie apparatus to which the video-camera signal processor of the present invention is applied. This apparatus comprises an optical system 140 including a zoom lens, an optical low-pass filter and so forth, and a camera 141 composed of the signal processor shown in FIG. 1 or 12. There is also included a video tape recorder (VTR) 142 which records and reproduces a video signal generated in the camera. The encoder 8 shown in FIG. 1 may be provided in such recording/reproducing part. In the video movie apparatus constituted by using the video-camera signal processor of the present invention, it becomes possible to attain a high-quality recorded/reproduced image with satisfactory color reproducibility.

Figure 15:
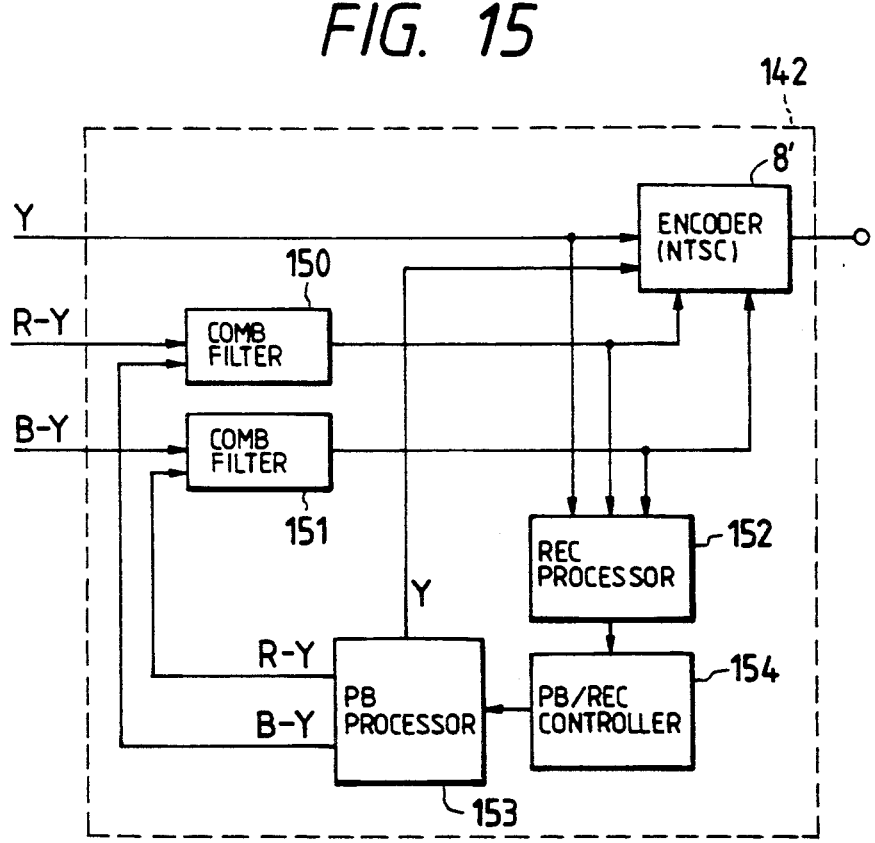
FIG. 15 is a block diagram of a video tape recorder.

FIG. 15 is a block diagram showing an exemplary constitution of the VTR in FIG. 14. A luminance signal Y and color difference signals R−Y and B−Y inputted from the camera are introduced to a recording processor 152 so as to be formed into recordable signals and then are recorded by a recording/playback controller 154. The signal reproduced by the recording/playback controller is introduced to a playback processor 153 so as to be converted into base-band signals Y, R−Y and B−Y. The color difference signals R−Y and B−Y are passed through comb filters 150, 151 for reducing the crosstalk component caused in the recording operation. The color difference signals outputted from the comb filters 150, 151 and the signal Y converted into a baseband signal are further converted into signals of NTSC format by an NTSC encoder 8′.

Thus, in this embodiment, NTSC-format signals are produced after the color difference signals inputted from the camera are passed through the comb filters 150, 151 in the VTR. In the color difference signals produced in the video-camera signal processor of FIG. 1, some variations may occur in the signal levels per horizontal line scan period when the 1H delay signal is deteriorated. Therefore the variations in the signal levels per horizontal line scan period are suppressed by passing the color difference signals through the comb filters 150, 151 in the VTR.

What is claimed is:

1. A signal processor for a video camera, comprising:
an image sensor including a photoelectric sensor with a two-dimensional array of photoelectric converter elements for generating first, second, third and fourth color signals, respectively, said image sensor further including output means for point-sequentially producing, during a first line scan period, a first mixed signal composed of the first and second color signals and a second mixed signal composed of the third and fourth color signals, and also point-sequentially producing, during a second line scan period which is repeated alternatively with the first line scan period, a third mixed signal composed of the second and third color signals and a fourth mixed signal composed of the first and fourth color signals;
distributive timing means connected to the output means of said image sensor and having first, second, third and fourth output terminals for outputting the first, second, third and fourth mixed signals, respectively, said timing means simultaneously generating the individual mixed signals obtained at said output terminals; and
a color matrix circuit for generating three primary color signals by processing the first, second, third and fourth mixed signals obtained at the output terminals of said distributive timing means.

2. A signal processor according to claim 1, wherein said distributive timing means comprises an input terminal connected to the output means of said image sensor; 1H delay means for delaying the signal of said input terminal for a time of one horizontal line scan period; a multiplexer for alternately outputting the signal of said input terminal and the output signal of said 1H delay means; and two color separator means for color-separating the signals outputted from said multiplexer.

3. A signal processor according to claim 1, wherein said distributive timing means comprises an input terminal connected to the output means of said image sensor; 1H delay means for delaying the signal of said input terminal for a time of one horizontal line scan period; two color separator means for color-separating the signal of said input terminal and the output signal of said 1H delay means; and two multiplexers for multiplexing the output signals of said two color separator means.

4. A signal processor according to claim 1, wherein said distributive timing means comprises color separator means for outputting two line sequential signals by color-separating the point sequential signals outputted from said image sensor; two 1H delay means for delaying said two line sequential signals for a time of one horizontal scan period respectively; and two multiplexers for multiplexing the output signals of said color separator means and the output signals of said 1H delay means.

5. A signal processor according to claim 1, wherein the output means of said image sensor has a vertical transfer part for transferring the output signals of said photoelectric converter elements vertically; a horizontal transfer part for receiving the signal from said vertical transfer part and transferring the received signal horizontally; and a 1H delay circuit driven by the same clock signal as that used for said horizontal transfer part, said 1H delay circuit serving to delay the output signal of said horizontal transfer part and thereby functioning as a component of said distributive timing means.

6. Color signal processor for a video camera comprising:
an image sensor including an array of first, second, third and fourth photoelectric converter elements for generating first, second, third and fourth electrical signals, respectively, and an output circuit connected to said photoelectric converter elements for generating at an output terminal thereof, during a first scan line period, a first mixed signal including said first and second electrical signals and a second mixed signal including said third and fourth electrical signals, said output circuit generating during a second scan line period a third mixed signal including said first and fourth electrical signals and a fourth mixed signal including said second and third electrical signals, said first and second scan line periods being alternatively repeated;

signal separator circuit having an input terminal coupled to said output terminal and first, second, third and fourth output terminals for separating said mixed signals during each scan line period so as to produce said first, second, third and fourth mixed signals, each mixed signal being separated and generated simultaneously at said first, second, third and fourth output terminals thereof; and a color matrix circuit having first, second, third, and fourth input terminals connected to said first, second, third and fourth output terminals of said separator circuit, respectively, and first, second and third output terminals for combining signals input at said first, second, third and fourth input terminals thereof to produce first, second, third and primary color signals at said first, second and third output terminals thereof.

7. Color signal processor for a video camera comprising:

an image sensor including an array of photoelectric converter elements for generating an electrical signal in response to a line scan of said array;

signal separator circuit having an input terminal supplied with said electrical signal and having first, second, third and fourth output terminals, a delay circuit for delaying an input signal applied thereto and outputting a delayed signal having a delay time of one line period, and a multiplexer through which said delay circuit is connected between said input terminal and at least one of said first, second, third and fourth output terminals, for processing said electrical signal to produce simultaneously first, second, third and fourth signals at said first, second, third and fourth output terminals thereof;

a color matrix circuit having a first, second, third and fourth input terminals connected to said first, second, third and fourth output terminals of said signal separator circuit, respectively, and first, second and third output terminals, said color matrix circuit combining signals input at said first, second, third and fourth input terminals thereof to produce first, second and third primary color signals at said first, second and third output terminals thereof, respectively; and a combining circuit for combining said electrical signal and said delayed signal from said delay circuit to produce a luminance signal whose vertical edge is emphasized.

8. Color signal processor for a video camera comprising:

an image sensor circuit including an array of photoelectric converter elements for sensing an image and for generating first, second, third and fourth electrical signals in response to the sensing of said image through first, second, third and fourth color filters, respectively, and an output circuit for producing a plurality of mixture signals, each of said mixture signals representing a mixture of two of said first, second, third and fourth electrical signals;

separating means for receiving said mixture signals and for separating and simultaneously producing said first, second, third and fourth electrical signals; and a color matrix circuit having first, second, third and fourth input terminals supplied with said first, second, third and fourth electrical signals, respectively, and first, second and third output terminals for combining said electrical signals to produce first, second and third primary color signals at said first, second and third output terminals thereof.

9. Color signal processor according to claim 7, wherein said image sensor circuit comprises a CCD image sensor having said first, second, third and fourth color filters mounted therewith and having an output terminal for outputting said mixture signals.

* * * * *